July 26, 1938.  L. H. MOOMAW  2,124,887
INDICATING MEANS FOR CAMERAS
Filed March 9, 1936
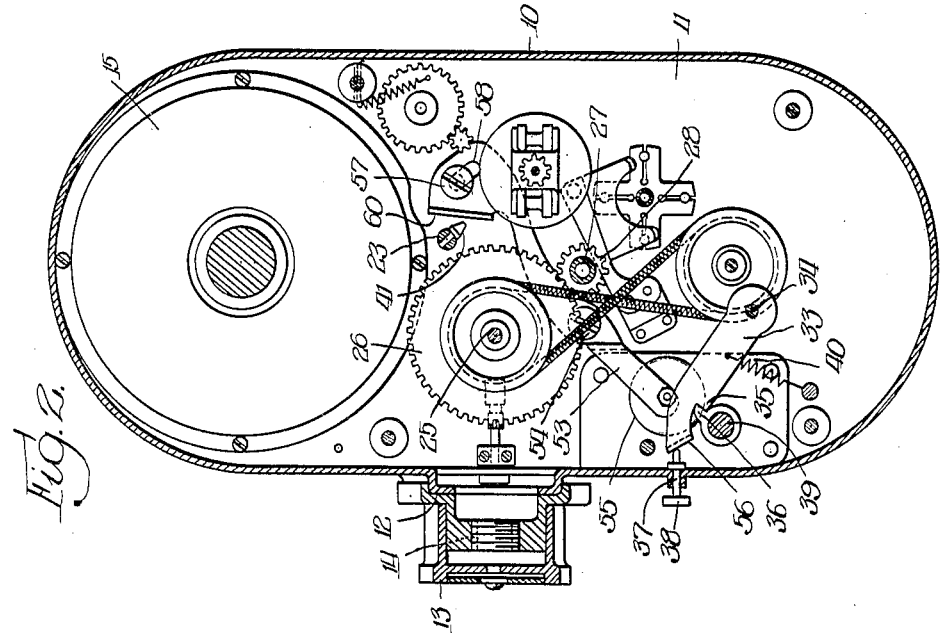
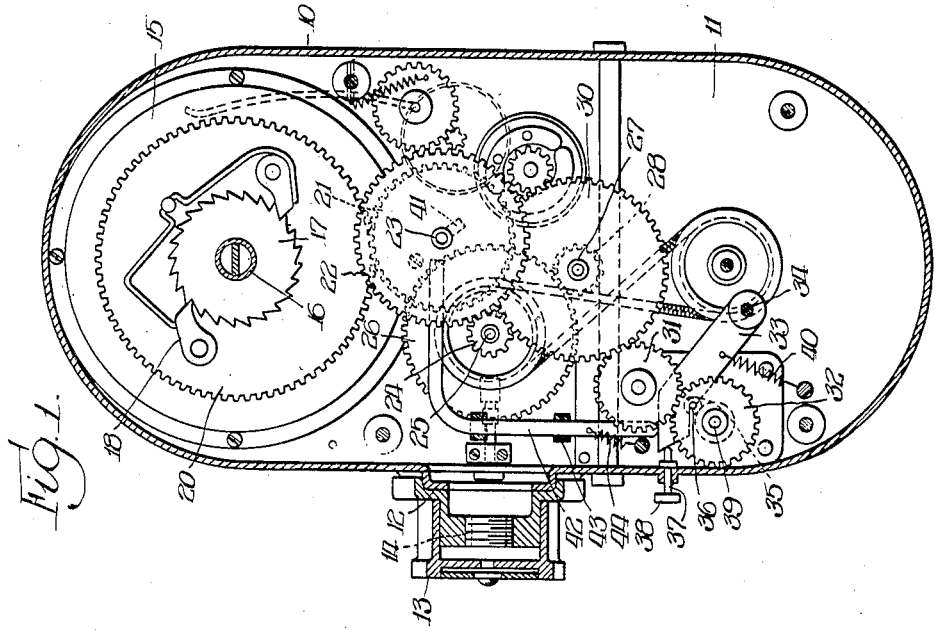
Inventor:
Lewis H. Moomaw, Patented July 26, 1938

2,124,887

UNITED STATES PATENT OFFICE 2,124,887

INDICATING MEANS FOR CAMERAS

Lewis H. Moomaw, Wilmette, Ill., assignor to Eastman Kodak Company, Rochester, N. Y., a corporation of New Jersey Application March 9, 1936, Serial No. 67,773

10 Claims. (Cl. 116—114)

The invention relates to cameras for making motion pictures and is particularly related to cameras to be used by amateurs in making pictures on eight or sixteen milli-meter films.

An object of the invention is to provide novel indicating means which will indicate to the operator equal lengths of travel of the film in the camera. The result of the present construction is that the operator, whether professional or amateur, will be able to accurately measure the time required for the proper length of run of the film for securing satisfactory projection of the pictures on the screen.

A further object of the invention is to provide signal means adapted to communicate to the operating finger of the operator pulsations upon the feeding of equal lengths of film and which can be applied to standard motion picture cameras without material alteration in their construction.

With these and various other objects in view the invention may consist of certain novel features of construction and operation as will be more fully described and particularly pointed out in the specification, drawing and claims appended hereto.

In the drawing which illustrates an embodiment of the invention and wherein like reference characters are used to designate like parts—

Figure 1 is a longitudinal sectional view taken through the motor compartment of the camera showing one form of signal means for indicating the travel of the film through the camera; and Figure 2 is a vertical sectional view taken through a camera similar to Figure 1, showing a modified form of signal means coming within the invention.

More particularly describing the invention as herein illustrated, reference numeral 10 indicates a motion picture camera housing or case which houses the operating mechanism of the camera supported from a partition plate 11. Said plate divides the casing 10 into a motor compartment and a film compartment, respectively. The mid-portion of one side of the casing is embossed as at 12, forming a shutter housing, the section of this embossed portion overlying the film compartment, being provided with a lens holder 13 having a suitable lens 14 mounted therein.

The operating mechanism of the camera for driving the film feeding claw consists of a spring motor, not shown, housed within the motor drum 15. The spring motor is wound by rotation of shaft 16 which has fixed thereto the ratchet 17 held by the spring pressed pawls 18. When the motor unwinds the driving gear 20 is rotated, imparting rotation to gears 21 and 22, fixed to shaft 23. Gear 22 has meshing engagement with pinion 24 fixed to shaft 25, and accordingly said pinion and gear 26, also fixed to shaft 25, are rotated. Shaft 27 carries pinion 28 and gear 30, the pinion meshing with gear 26 and said gear 30 through gears 31 and 32 driving the film feeding claw, not shown, which feeds the film past the exposure aperture of the camera. Starting and stopping of the camera is controlled by means of a lever 33 suitably pivoted at 34, and provided at its outer end with a shoulder 35 engaging the pin 36 fixed to gear 32. The lever 33 is raised out of engagement with the pin by means of the starting and stopping rod 37 suitably mounted in the casing below the lens mount and having a finger engaging button 38. The inner end of rod 37 engages the tapered upper end of the lever 33 and when said pin is depressed the lever is correspondingly raised against the tension of spring 40 to free the gear 32, permitting operation of the camera. Camera mechanism such as above described is more particularly disclosed in my Patent No. 1,979,984 granted November 6, 1934.

Suitably fixed to shaft 23 is a projecting pin or stud 41 adapted to engage during its rotation the projecting end of the right angled member 42. Said member is suitably mounted on the partition 11 by brackets 43 and is yieldingly held with its lower end in contact with lever 33 by the spring 44. The lower depending end of member 42 yieldingly rests on the starting and stopping lever 33 while the other end of said member is positioned adjacent shaft 23 so as to be engaged by stud 41 during each revolution of said shaft. Engagement of the stud 41 with the member lifts the member upwardly and the pressure upon the starting and stopping lever 33 is accordingly released. The member 42 is held in raised position for a short interval of time as stud 41 soon passes out of contact with the lateral extending end of said member. When the member is released the same is caused to snap against lever 33 by spring 44, thereby imparting a signal to the finger of the operator in contact with the button 38. The mechanism has been designed so that the signal occurs once during the travel through the camera of a definite length of film which for practical purposes is generally one foot of film. The correct number of exposures for any object can therefore be easily determined by the operator and the construction has the advantage of simplicity and the fact that it can be easily applied to cameras of standard construction.

In Figure 2 a modified form of signal indicating means is disclosed consisting of a lever 53 suitably pivoted to the partition 11 at 54. The end of said lever adjacent the starting and stopping lever 33 carries a smooth surface wheel 55 and which is located immediately adjacent so as to have contact with the flange 56 on the free end of the starting and stopping lever 33. Said lever is provided with a shoulder 35 adapted to have engagement with the pawl 36 rotating with the shaft 39.

The pivoted lever 53 at its opposite end is suitably guided by screw 57 which operates within a slot 58 formed in said end of the lever. Also this end of the lever is provided with a flange 60 and which is positioned near shaft 23 so as to be engaged by stud 41 during each revolution of the shaft.

When the starting and stopping button 38 is pressed inward to raise the lever 33 the flange 56 thereon is caused to contact the smooth surface wheel 55. This results in operation of the camera mechanism and shaft 23 accordingly rotates. When stud 41 is moved into contact with flange 60 of the member 53 the member will be caused to rock, imparting downward movement to the lower end of the member and thus to the smooth surface wheel 55 carried thereby. A corresponding impulse will be transmitted to the lever 33 and through the starting and stopping button 38 to the fingers of the operator. The amount of film fed between impulses will therefore be uniform and by reason of the impulses the operator will be able to take the correct number of exposures for a particular action picture.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. In a film handling apparatus, the combination with a driving means for advancing film through said apparatus at any desired rate, of a feelable member actuated by said driving means and located normally to be available to the sense of feeling of the operator.

2. In a film handling apparatus, the combination with a driving means for advancing film through said apparatus at a predetermined rate and including a rotatable member, of a feelable member moved by the rotatable member of said driving means arranged to be accessible to the sense of feeling of the operator during normal operation of said apparatus, and moved by said rotatable member at a rate corresponding to the rate of film advancement.

3. In a film handling apparatus, the combination with a driving means for advancing film through said apparatus at a predetermined rate, of a feelable member pulsated by said driving means in timed relation to the rate of film advancement and positioned for imparting sensations to the sense of feeling of the operator.

4. In a film handling apparatus, the combination with a casing for said apparatus, and a driving means for advancing film through said casing, of a feelable member movably mounted with respect to said casing in a position available to the touch of the operator during normal operation of the apparatus and actuated by said driving means periodically to affect the operator's sense of feeling in timed relation to the rate of film advancement.

5. In a film handling apparatus, the combination with a casing for said apparatus, and a driving means for advancing film through said casing and including a rotatable member, of a protuberance eccentrically located on said rotatable member and positioned for periodically imparting a feelable sensation to the operator.

6. In a motion picture apparatus, the combination with a casing for said apparatus, and a driving means for advancing film through said apparatus and including a rotatable member, of a feelable member movably mounted with respect to said casing and extending to the exterior of said casing, and a protuberance on said rotatable member for imparting an impulse to said feelable member upon each rotation of said rotatable member.

7. In a motion picture apparatus, the combination with a casing for said apparatus, and a driving means for advancing film through said apparatus and including a rotatable member, of a feelable member movably mounted with respect to said casing in a position available to the touch of the operator during normal operation of the apparatus, a protuberance on said rotatable member, and a means movably mounted and arranged for movement by said protuberance and for movement of said feelable member.

8. In a film handling apparatus, the combination with a driving means for advancing film through said apparatus at a predetermined rate, and a release means for controlling the operation of said driving means and including a manually operable member available from the exterior of said apparatus, of a pulsating means actuated by said driving means in correspondence with the rate of film advancement and arranged to engage said release means for imparting impulses thereto and to said manually operable member.

9. In a film handling apparatus, the combination with a driving means for advancing film through said apparatus at a predetermined rate, and including a rotatable member, and a release means for controlling the operation of said driving means and including a manually operable member available from the exterior of said apparatus, of a pulsating member normally engaging said release means and intermittently displaced therefrom and released by said rotatable member of the driving means in correspondence with the rate of film advancement intermittently to strike said release means and impart to said manually operable member pulsations corresponding to the rate of film advancement.

10. In a film handling apparatus, the combination with a driving means for advancing film through said apparatus at a predetermined rate, and including a rotatable projection, and a release means adapted normally to engage said driving means to stop the same and including a finger member operable from the exterior of the apparatus for operation of said driving means, of a pulsating member movably mounted, having a portion resiliently urged to engage said release means, and having a second portion intermittently engaged by said rotatable projection to displace the first mentioned portion from said release means and then disengaged so that said pulsating member strikes said release means and imparts an impulse to said finger member.

LEWIS H. MOOMAW.